US008637171B2

(12) United States Patent
Hamelers et al.

(10) Patent No.: US 8,637,171 B2
(45) Date of Patent: Jan. 28, 2014

(54) DEVICE AND METHOD FOR CONVERTING LIGHT ENERGY INTO ELECTRICAL ENERGY

(75) Inventors: Hubertus Victor Marie Hamelers, Heelsum (NL); David Petrus Bonifacius Theodorus Bernardus Strik, Wageningen (NL); Jan Frederik Hendrik Snel, Wageningen (NL); Cees Jan Nico Buisman, Harich (NL)

(73) Assignee: Plant-e Knowledge B.V., Wageningen (NL)

( * ) Notice: Subject to any disclaimer, the term of this patent is extended or adjusted under 35 U.S.C. 154(b) by 933 days.

(21) Appl. No.: 12/596,298

(22) PCT Filed: Apr. 17, 2008

(86) PCT No.: PCT/NL2008/050219
§ 371 (c)(1),
(2), (4) Date: Apr. 7, 2010

(87) PCT Pub. No.: WO2008/127100
PCT Pub. Date: Oct. 23, 2008

(65) Prior Publication Data
US 2010/0190039 A1    Jul. 29, 2010

(30) Foreign Application Priority Data

Apr. 17, 2007   (NL) ..................................... 2000598

(51) Int. Cl.
*H01M 8/06* (2006.01)
(52) U.S. Cl.
USPC .............................................. 429/2; 429/400
(58) Field of Classification Search
USPC ................................................... 429/2, 400
See application file for complete search history.

(56) References Cited

U.S. PATENT DOCUMENTS

| 3,477,879 A * | 11/1969 | Sisler ................................ 429/2 |
| 4,117,202 A * | 9/1978 | Beck ................................. 429/2 |
| 2007/0298472 A1 * | 12/2007 | Zeikus et al. .................. 435/128 |

FOREIGN PATENT DOCUMENTS

| CA | 1099332 | 4/1981 |
| WO | WO 2007/006107 A2 | 1/2007 |

OTHER PUBLICATIONS

Enren Chang, et al. "Electricity generation from acetate and glucose by sedimentary bacterium attached to electrode in microbial-anode fuel cells", ScienceDirect, Journal of Power Sources 161 (2006), pp. 820-825.
International Search Report corresponding to PCT/NL2008/050219, dated Jun. 8, 2008, 2 pages.
Liu, H et al., "Electrochemically assisted microbial production of hydrogen from acetate", Environmental Science and Technology, vol. 39, No. 11 (2005) pp. 4317-4320.

(Continued)

*Primary Examiner* — Mark F Huff
*Assistant Examiner* — Monique Wills
(74) *Attorney, Agent, or Firm* — Gilberto M. Villacorta; Sunit Talapatra; Foley & Lardner LLP

(57) ABSTRACT

The invention relates to a device comprising a reactor, where the reactor comprises an anode compartment and a cathode compartment, and where the anode compartment comprises a) an anodophilic micro-organism capable of oxidizing an electron donor compound, and b) a living plant or part thereof. The invention also relates to a method for converting light energy into electrical energy and/or hydrogen, where a feedstock comprising an electron donor compound is introduced into the device.

9 Claims, 2 Drawing Sheets

(56) References Cited

OTHER PUBLICATIONS

Figure 1:
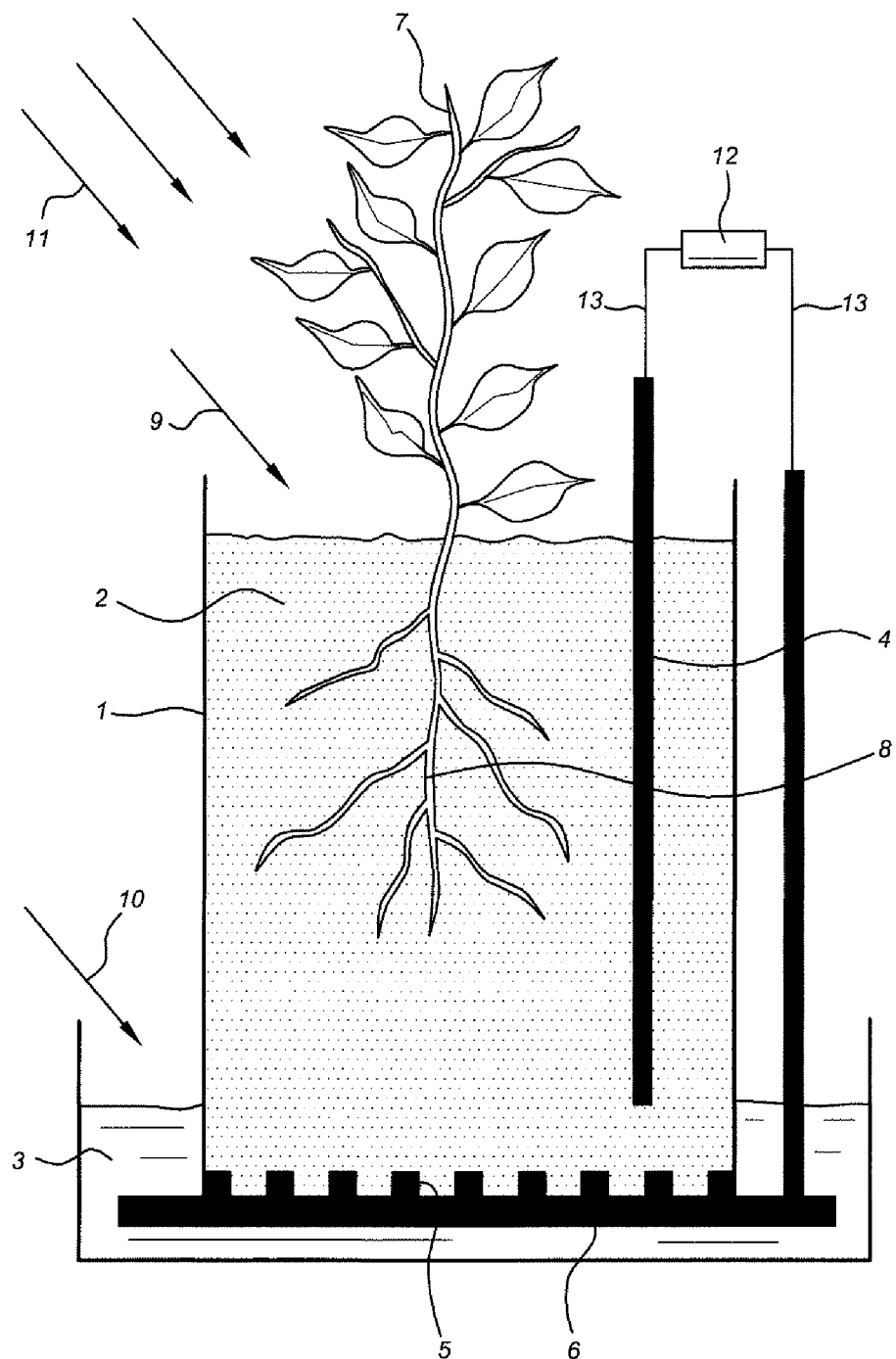

Logan, B.E. et al., "Electricity-producing bacterial communities in microbial fuel cells", Trends in Microbiology, vol. 14, No. 12 (2006) pp. 512-518.

Logan, B.E. et al., "Microbial fuel cells: Methodology and technology", Environmental Science and Technology, vol. 40, (2006) pp. 5181-5192.

Lovley, D.R., "Bug juice: harvesting electricity with micro-organisms", Nature Reviews Microbiology. vol. 4 (2006) pp. 497-508.

Lovley, D.R., "Microbial fuel cells: novel microbial physiologies and engineering approaches", Current Opinion in Biotechnology, vol. 17 (2006) pp. 327-332.

Lynch, J.M., "The Rhizosphere", John Wiley & Sons, 1990.

Rabaey, K et al., "Microbial fuel cells: sustainable core technology", Trends in Biotechnology, vol. 23 (2005) pp. 291-298.

Rosenbaum, M. et al., "In situ electrooxidation of photobiological hydrogen in a photobioelectrochemical fuel cell based on *Rhodobacter sphaeroides*", Environmental Science and Technology, vol. 39, (2005) pp. 6328-6333.

Rosenbaum, M. et al., "Utilizing the green alga *Chlamydomonas reinhardtii* for microbial electricity generation: A living solar cell", Applied Microbiology and Biotechnology, vol. 68, (2005) pp. 753-756.

Rozendal, R.A. et al., "Principle and perspectives of hydrogen production through biocatalyzed electrolysis", Int. J. Hydrogen Energy, vol. 31, (2006) pp. 1632-1640.

\* cited by examiner

DEVICE AND METHOD FOR CONVERTING LIGHT ENERGY INTO ELECTRICAL ENERGY

CROSS-REFERENCE TO RELATED APPLICATIONS

This application is a National Stage of PCT/NL2008/050219, filed Apr. 17, 2008, which claims the benefit and priority to NL 2000598, filed Apr. 17, 2007. The foregoing applications are incorporated by reference herein in their entirety.

FIELD OF THE INVENTION

The present invention relates to a device and a method for converting light energy into electrical energy and/or hydrogen by using a living plant for converting light energy into a feedstock for a microbial fuel cell.

BACKGROUND TO THE INVENTION

Microbial fuel cells are known from the prior art. For example, WO 2007/006107 discloses a microbial fuel cell that comprises a reactor, and each reactor comprises an anode compartment, a cathode compartment and a membrane, where the membrane separates the anode compartment and the cathode compartment from each other. The anode compartment contains micro-organisms capable of oxidizing organic electron donor compounds, the electrons being supplied to the anode in the anode compartment. According to WO 2007/006107, the organic electron donor compound in question can be glucose, sucrose, an acetate or a reducing compound of the type occurring for example in domestic sewage and the effluent of bio-refineries.

Other microbial fuel cells are described for example in: Logan et al., 2006, Lovley, 2006a; Lovley, 2006b; Rabaey and Verstraete, 2005, and Verstraete and Rabaey, 2006. The oxidation of the electron donor compounds can be catalysed for example by anodophilic and/or cathodophilic micro-organisms and redox enzymes. In some applications, hydrogen is produced in the cathode compartment as an energy carrier, instead of electricity (Liu et al., 2005; Rozendal et al., 2006).

Some fuel cells are designed in such a way that it is possible to transform photosynthetic activities into electricity. U.S. Pat. No. 3,477,879 discloses a device for converting light energy into electrical energy, where the device consists of an anode compartment containing an aqueous medium, where this aqueous medium contains live and dead algae and minerals, including sulphide, that occur in sea water, and a cathode compartment containing an aqueous medium, where this aqueous medium contains bacteria and minerals, including sulphate, that occur in sea water. The anode compartment and the cathode compartment are connected by an ion bridge or "salt bridge". The live algae are capable of producing oxygen. When the device is in operation, dead algae are pumped from the anode compartment into the cathode compartment, where they serve as a nutrient for the bacteria that are capable of converting sulphate into sulphide. When sulphate is converted into sulphide, electrons are taken up. Sulphide is converted into sulphate and hydrogen ions ($H^+$) at the cathode, as a result of which electrons are released at the cathode which are taken up again by oxygen via the anode, and the oxygen is then converted into hydroxide ions ($OH^-$). The hydrogen ions and the hydroxide ions diffuse across the salt bridge and combine to form water, which completes the electrical circuit.

U.S. Pat. No. 4,117,202 and CA 1,099,332 disclose a biological electrical cell, where use is made of isolated mesophilic cells derived from what are called $C_4$ plants, i.e. plants capable of converting $CO_2$ into organic compounds containing four carbon atoms, for example oxalacetate, aspartate and malate. Such cells are also described in Rosenbaum et al., 2005a and Rosenbaum et al., 2005b. Isolated $C_4$ photosynthesizing plant cells, green algae or (hydrogen producing) bacteria are used in these devices.

A disadvantage of the microbial fuel cells according to WO 2007/006107 is that an effluent stream such as domestic waste water is used. Effluent streams are not sustainable or renewable, and cannot be sustainably obtained, due to transport, for example. A great deal of energy is invested before effluent streams are obtained, and this involves a large $CO_2$ emission from fuels, for example fossil fuels or radioactive waste released in the generation of nuclear energy. It is true that by increasing the production of effluent streams, more energy can be produced by fuel cells, but such a method does not offer a sustainable or renewable solution for the increasing world consumption of electrical energy. It is therefore better to generate or regenerate energy in a sustainable or renewable way. The present invention provides a solution for the problem of reducing non-sustainable and non-renewable energy.

SUMMARY OF THE INVENTION

The present invention relates to a device that comprises a reactor, where the reactor comprises an anode compartment and a cathode compartment and where the anode compartment comprises a) an anodophilic micro-organism capable of oxidizing an electron donor compound, and b) a living plant or part thereof.

The present invention also relates to a method for converting light energy into electrical energy and/or hydrogen, where a feedstock comprising an electron donor compound is introduced into a device that comprises a reactor, where the reactor comprises an anode compartment and a cathode compartment and where the anode compartment comprises a) an anodophilic micro-organism capable of oxidizing an electron donor compound, and b) a living plant or part thereof.

DETAILED DESCRIPTION OF THE INVENTION

The verb "to comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the element are present, unless the context clearly requires that there is one and only one of the elements. The indefinite article "a" or "an" thus usually means "at least one".

The term "living plant or part thereof" is used in this document in the sense of a plant (or any part thereof) belonging to the Plant Kingdom (Plantae) and comprising at least one eucaryotic cell with a cell membrane, capable of converting light energy into an electron donor compound by means of photosynthesis. The term "living plant or part thereof" therefore also covers separate, possibly undifferentiated plant cells that are obtained for example by tissue culture and are capable of converting light energy, by means of photosynthesis, into an electron donor compound, plants or their parts which are (partly) dead, and algae.

According to the invention, the electron donor compound is converted into electrical energy and/or chemical energy, preferably in the form of hydrogen, with the aid of an anodophilic micro-organism.

According to the invention, the electron donor compound is preferably an organic compound.

A membrane that can transport ions selectively can be used to separate the anode compartment from the cathode compartment. It is also possible to employ electrically non-conducting, non-ion-selective porous materials. Examples of these materials are glass and plastic. However, a membrane that can transport ions selectively is preferred. The membrane is preferably a cation-selective membrane and more preferably a proton-selective membrane.

The plant or its part is preferably derived from what is called an energy plant. An energy plant is a living plant that contributes to sustainable energy: solar energy is present during the daytime and can be stored by living plants or their parts for example in the form of an electron donor compound, while $CO_2$ is absorbed from the atmosphere. Hence, an energy plant is to be understood as a living plant capable of converting light energy into chemical energy.

Various parts of a plant, for example fallen leaves or roots that have not been harvested, can be used as an energy plant. These parts are lost from renewable energy supply. A large part of the solar energy stored by the plant leaves the plant under the ground, due to the roots dying and respiring and by the release of an exudate. This process stimulates the growth of soil micro-organisms. These processes are defined as rhizodeposition. It has been established that nearly all types of chemical components of a plant can be lost by root losses. These components are for example carbohydrates such as sugars, amino acids, organic acids, hormones and vitamins. These components are classified into 4 groups, depending on their origin: exudates, secretions, lysates and gases. Exudates seep out of the root without the involvement of metabolic energy, while in the case of secretions, proper metabolic processes take place in the plant. Lysates are due to the root dying off. Gases also come from the roots of the plant (Lynch, 1990). Rhizodeposition depends for example on the type of the plant, its age and circumstances of life. Cast-off plant parts such as fruits, branches and leaves can contribute to the increase of organic matter in the soil. It is therefore preferred according to the invention that the plant or part thereof is an energy plant or a part thereof, in which case the living plant or part thereof converts light energy into at least an electron donor compound, which is subsequently converted into electrical energy and/or hydrogen, preferably by the root system of a living plant, in cooperation with a micro-organism.

According to the invention, the electron donor compound can be present in exudates, secretions, lysates, vegetable matter from dead plant parts, gases and/or a gum of plant origin, derived from the root system of a plant or a part thereof. The electrons produced by micro-organisms are transported from the anode first to a resistance or a device that consumes electrical energy, and then to the cathode. Oxygen, especially oxygen from the atmosphere, is used as the terminal electron acceptor.

According to an embodiment of the present invention, the anode preferably comprises an anodic material, said anodic material preferably being selected from the group consisting of graphite granules, graphite felt, graphite rods, other graphite-containing electron conductors and combinations of one or more of such materials, the root zone of a living plant essentially being present in the anodic material. This means in particular that the roots of the living plant are mainly placed in the anodic material. The added advantage of this is that the plant has a grip.

The micro-organism that converts the electron donor compound of the plant or part thereof preferably lives around the root zone of the living plant (called the rhizosphere), so the micro-organism can release electrons to the anode more easily.

In another embodiment according to the present invention, the reactor comprises a number of anode compartments, which are closed off from the surroundings (the atmosphere).

In yet another embodiment according to the present invention, the reactor comprises an anode compartment that can be opened, so that it can be in contact with the surroundings thereof. This has the advantage that the living conditions of the living plant, such as temperature, light and/or moisture, can be regulated.

According to the invention, the feedstock for the anode compartment can be one or more micro- and/or macronutrients and/or water for the living plant or part thereof or for the micro-organism. The feedstock is preferably a balanced amount of micro- and/or macronutrients and water.

According to the invention, it is preferable for the anode compartment to comprise a redox mediator (also called an electron shuttle), so that the electron transport in the anode compartment is made easier.

In another preferred embodiment, the device comprises a number of components that reduce or prevent the production of methane in the anode compartment.

Living plants evaporate water that has been taken up for example by the root system. Therefore, an embodiment of the device according to the invention is equipped with an overflow for the removal of excess feedstock introduced into the anode compartment. In another preferred embodiment, this overflow leads from the anode compartment to the cathode compartment.

The invention is explained in more detail with the aid of FIG. 1. FIG. 1 shows a reactor 1 that is provided with an anode compartment 2 and a cathode compartment 3. The anode compartment 2 contains an anode 4, and the cathode compartment 3 contains a cathode 5. The anode compartment 2 and the cathode compartment 3 are separated from each other by a membrane 6. The anode compartment 2 accommodates a living plant 7, placed in it in such a way that the roots 8 of the living plant are surrounded by the anodic material in granular form. Both the anode compartment and the cathode compartment are in contact with the surroundings—see the arrows 9 and 10. Light energy 11, for example sunlight, can reach the living plant directly. Oxygen (coming from the atmosphere) can diffuse into the cathode compartment. The anode and the cathode are connected electrically with each other by a resistance or a device that consumes electrical energy (12), with the aid of electrical connections 13.

EXAMPLE

Eight vertically placed tubular microbial fuel cells were made from Schott Duran glass. The height of each tube was 30 cm and its diameter was 3.5 cm. At a height of 2 cm and 28 cm, there was a glass side-arm, the lower of which was closed off with a rubber bung and the upper kept open to ensure an overflow function. The top end of the tube was left open, so that the above-ground part of the plant protruded there. A cation exchange membrane (FKL type, FuMA-tech GmbH, St. Ingbert, Germany) was placed at the bottom with the aid of a GL45 screw cap that had a cut-out in it (diameter: 3 cm). A 3-mm-thick graphite felt (FMI Composites Ltd., Galashiels, Scotland) was placed on the inside of the glass tube. A graphite rod (measurements: 26×14×6 mm; Müller & Rössner GmbH & Co., Sieburg, Germany) was introduced into the graphite felt. The tube was then filled with graphite granules (diameter between 1.5 and 5 mm; Le Carbone, Belgium). A 3-mm-thick graphite felt (measurements: 8×8 cm; FMI Composites Ltd., Galashiels, Scotland) was then placed at the bottom of a large glass beaker. On this graphite felt were then placed the glass tube and, parallel to it, a second graphite rod. The anodic electrode and the cathodic electrode were formed by the graphite components inside and outside the glass tube, respectively. The (electrical) circuit of the anode and cathode was completed by plastic-coated copper wires running from the graphite rods to the external resistance R of 1000 Ohms.

The electrode potentials and the cell voltage [E (cell) in mV] were measured off-line with a Multimeter (True RMS Multimeter, Fluke 189). Ag/AgCl reference electrodes (ProSense Qis, Oosterhout, Netherlands) were used for measuring the electrode potentials. The cell voltage was determined continuously with the aid of FieldPoint FP-AI-110 modules (National Instruments, Netherlands), a personal computer (Pentium III) and a self-programmed Labview 7.0 program (National Instruments, Netherlands). The current intensity (I in mA) was then calculated from Ohm's law [I=E (cell)/R]. The power output (P in watts) of the microbial fuel cell was calculated from the cell voltage and the current intensity [P=I×E (cell)].

The light was provided by a 250 W metal halogen lamp (Spacesaver C/TLBH250), later supplemented by a 400 W metal halogen lamp (Spacesaver C/TLBH400), placed at a height of 125 cm above the table that supported the experimental assembly. The room accommodating the microbial fuel cell was lit by TL tubes and indirect sunlight. White screens above and on two sides of the assembly ensured the reflection of light. The lamps were kept on for 14 hours during the day with the aid of a time switch, after which they were switched off for 10 hours at night. The assembly was housed in a room kept at room temperature (about 20-25° C.). From day 26, the temperature was measured on-line with a copper-constantan thermocouple and recorded by a Fieldpoint (FP) module, using the abovementioned personal computer and program. The temperature was in the region of 24-27° C.

The anode compartments of the microbial fuel cell were primed with a modified Hoagland nutrient solution (Taiz and Zeiger, 2006), with extra micronutrients for e.g. the microorganism. The solution had the following composition, with the concentrations in mg per liter given in brackets: $KNO_3$ (606.60), $Ca(NO_3)_2.4H_2O$ (944.64), $NH_4H_2PO_4$ (230.16), $MgSO_4.7H_2O$ (246.49), KCl (3.73), $H_3BO_3$ (1.55), $MnSO_4.H_2O$ (0.34), $ZnSO_4.7H_2O$ (0.58), $CuSO_4.5H_2O$ (0.12), $(NH_4)_6Mo_7O_{24}.4H_2O$ (0.09), $H_2MoO_4$ with 85% of $MoO_3$ (161.97), $CoCl_2.6H_2O$ (2.00), $Na_2SeO_3$ (0.10), EDTA as Titriplex II (30.00), $FeCl_2.4H_2O$ (10.68), $Ni_2Cl.6H_2O$ (0.06), $Na_2SiO_3.9H_2O$ (284.20).

The solution was neutralized to a pH of about 7 with 2M NaOH. It was inoculated with the effluent from another operating microbial fuel cell. Potassium acetate (KAc) was introduced as the feedstock in batches, so that the anodophilic micro-organisms, amongst others, would proceed to multiply in the fuel cell. The cathode compartment was filled with 50 mM $K_3Fe(CN)_6$ and 100 mM $KH_2PO_4$, which were neutralized to a pH of about 7. This solution was later replaced by demineralised water with 2 ml of phosphate buffer per liter ($K_2HPO_4$ 132.7 g/l$^{-1}$; $KH_2PO_4$: 168.5 g/l$^{-1}$). The volume of the anode liquid and the volume of the cathode liquid amounted to about 250 and 200 ml, respectively.

The acetate was consumed in the microbial fuel cells, and the cell voltage over the anode and cathode was measured. When this cell voltage had dropped, all the graphite granules were removed from the assembly and saved. The residual KAc was removed as far as possible by rinsing the graphite granules with the nutrient medium. Extra graphite granules were then introduced, and the KAc concentration was determined. After this, the granules were distributed over the eight microbial fuel cells.

A collection of reed sweet grass (*Glyceria maxima*, synon. *Glyceria aquatica*) was obtained from the bed of a brook at Renkum (the Netherlands). The stems of the reed sweet grass were separated (which sometimes called for cutting through the horizontal rhizome) and thoroughly washed, so that the organic matter was removed. The brown parts of the plant were cut off, so that only green plants of reed sweet grass remained. Wet reed sweet grass plants were placed in the anode compartment of six microbial fuel cells (numbers 3 to 8), using 20 to 30 plants per cell. Two microbial fuel cells did not receive any living plants but were treated in the same way as the other microbial fuel cells and acted as reference samples (microbial fuel cells number 1 and 2).

The level of the anode liquid dropped during the experiment, due to evaporation. It was regularly replenished with demineralised water (up to day 13) or with Hoagland nutrient solution (on days 13-19), or with Hoagland nutrient solution with a buffer (4 ml/l with $K_2HPO_4$ 132.7 g/l; $KH_2PO_4$: 168.5 g/l) (on days 19 to 34), or with Hoagland solution without any nitrogen, having the following composition, the concentration in mg per liter being given in brackets: $MgSO_4.7H_2O$ (246.49), KCl (3.73), $H_3BO_3$ (1.55), $MnSO_4.H_2O$ (0.34), $ZnSO_4.7H_2O$ (0.58), $CuSO_4.5H_2O$ (0.12), $(NH_4)_6Mo_7O_{24}.4H_2O$ (0.09), $H_2MoO_4$ with 85% of $MoO_3$ (161.97), $CoCl_2.6H_2O$ (2.00), $Na_2SeO_3$ (0.10), EDTA as Titriplex II (30.00), $FeCl_2.4H_2O$ (10.68), $Ni_2Cl.6H_2O$ (0.06), $Na_2SiO_3.9H_2O$ (284.20) with a buffer (4 ml/l$^{-1}$ with $K_2HPO_4$ 132.7 g/l$^{-1}$; $KH_2PO_4$: 168.5 g/l$^{-1}$) (from day 34 to the end). A pump, installed on day 23, was used to introduce the nutrient solution at 15-minute intervals, under the control of a time switch. Any excess medium flowed into a receiving flask via an overflow.

The level of the cathode liquid also dropped during the experiment. It was replenished regularly by the addition of demineralised water. On day 14, the cathode liquid was replaced with a new cathode liquid, which contained demineralised water with a phosphate buffer ($K_2HPO_4$ 132.7 g/l$^{-1}$; $KH_2PO_4$: 168.5 g/l$^{-1}$; 2 ml/l). The graphite cloth in the cathode was replaced here with a new piece of cloth. It was noticed that some previous cathode liquid remained in the cathode compartment, possibly coming from the membrane.

Figure 2:
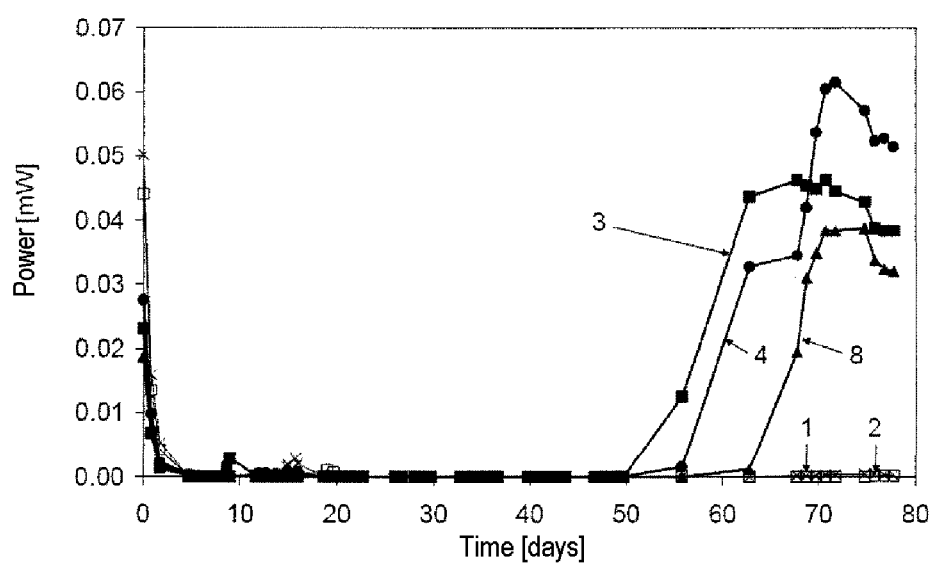

FIG. 2 shows the power output of three microbial fuel cells with reed sweet grass (numbers 3, 4 and 8) and the two reference fuel cells (numbers 1 and 2) for days 1 to 78. The maximum specific power, measured off-line, was 0.062 mW. The reference assemblies did not produce any electric energy, but the assemblies with reed sweet grass did. The reed sweet grass plants remained vital and grew during this experiment as well.

REFERENCES

H. Liu, S. Grot and B. E. Logan (2005): "Electrochemically assisted microbial production of hydrogen from acetate", *Environmental Science and Technology*, 39, No. 11 (2005) pp. 4317-4320

B. E. Logan, B. Hamelers, R. Rozendal, U. Schröder, J, Keller, S. Freguia, P. Aelterman, W. Verstraete and K. Rabaey (2006): "Microbial fuel cells: Methodology and technology", *Environmental Science and Technology*, 40 (2006) pp. 5181-5192

B. E. Logan and J. M. Regan (2006): "Electricity-producing bacterial communities in microbial fuel cells", *Trends in Microbiology*, 14, No. 12 pp. 512-518

D. R. Lovley (2006a): "Bug juice: harvesting electricity with micro-organisms", *Nature Reviews Microbiology*, 4 pp. 497-508

D. R. Lovley (2006b): "Microbial fuel cells: novel microbial physiologies and engineering approaches", *Current Opinion in Biotechnology*, 17 pp 327-332

J. M. Lynch: "The Rhizosphere", John Wiley & Sons, 1990

K. Rabaey and W. Verstraete (2005); "Microbial fuel cells: sustainable core technology", *Trends in Biotechnology*, 23 pp. 291-298

M. Rosenbaum, U. Schröder and F. Scholz (2005a): "Utilizing the green alga *Chlamydomonas reinhardtii* for microbial electricity generation: A living solar cell", *Applied Microbiology and Biotechnology*, 68 pp. 753-756

M. Rosenbaum, U. Schröder and F. Scholz (2005b): "In situ electrooxidation of photobiological hydrogen in a photobioelectrochemical fuel cell based on *Rhodobacter sphaeroides*", *Environmental Science and Technology*, 39 pp. 6328-6333

R. A. Rozendal, H. V. M. Hamelers, G. J. W. Euverink, S. J. Metz and C. J. N. Buisman (2006): "Principle and perspectives of hydrogen production through biocatalyzed electrolysis", *Int. J. Hydrogen Energy*, 31 pp. 1632-1640

L. Taiz and E. Zeiger (2006): "Plant Physiology", Sinauer Associates, Inc., Sunderland, USA

The invention claimed is:

1. A method for converting light energy into electrical energy and/or hydrogen comprising:
   (a) obtaining a reactor comprising an anode compartment having an anodic material and a cathode compartment;
   (b) introducing to the anode compartment, in any order,
      (i) feedstock comprising an electron donor compound;
      (ii) an anodophilic micro-organism capable of oxidizing the electron donor compound;
      (iii) a living plant or part thereof having a root, wherein the root is placed in the anodic material; and
   (c) providing light to the reactor, wherein energy from the light is converted into electrical energy and/or hydrogen.

2. The method according to claim 1, further comprising printing the anode compartment with a nutrient solution.

3. The method according to claim 1, further comprising filling the anode compartment with a solution.

4. The method according to claim 1, wherein the electron donor compound is an organic compound.

5. The method according to claim 1, wherein the plant is a plant capable of converting light energy into chemical energy.

6. The method according to claim 1, wherein the electron donor compound is an exudate, a secretion, a lysate, vegetable matter from dead parts of plants, a gas and/or a gum of plant origin.

7. The method according to claim 1, wherein the feedstock comprises one or more micro- and/or macronutrients.

8. The method according to claim 1, wherein the anode compartment comprises a redox mediator.

9. A method for converting light energy into electrical energy and/or hydrogen, comprising providing light to a reactor to convert energy from the light into electrical energy and/or hydrogen, wherein the reactor comprises:
   (a) an anode compartment comprising an anodic material and (i) an anodophilic micro-organism capable of oxidizing an electron donor compound and (ii) a living plant or part thereof having a root, wherein the root is placed in the anodic material; and
   (b) a cathode compartment.

* * * * *